(12) United States Patent
Butland

(10) Patent No.: US 9,417,422 B2
(45) Date of Patent: Aug. 16, 2016

(54) RIGID ADAPTOR RING FOR CTE MISMATCHED OPTICAL DEVICE COMPONENTS

(75) Inventor: Adam G. Butland, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 460 days.

(21) Appl. No.: 13/592,407

(22) Filed: Aug. 23, 2012

(65) Prior Publication Data

US 2013/0051897 A1 Feb. 28, 2013

Related U.S. Application Data

(60) Provisional application No. 61/526,502, filed on Aug. 23, 2011.

(51) Int. Cl.
*G02B 7/00* (2006.01)
*F41G 1/32* (2006.01)
*F41G 1/38* (2006.01)
*G02B 7/02* (2006.01)

(52) U.S. Cl.
CPC *G02B 7/008* (2013.01); *F41G 1/32* (2013.01);
*F41G 1/38* (2013.01); *G02B 7/028* (2013.01);
*Y10T 403/213* (2015.01)

(58) Field of Classification Search
CPC .......... G02B 7/008; G02B 7/02; G02B 7/022; G02B 7/028
USPC .......... 403/28, 29, 30, 336; 359/819, 820, 830
See application file for complete search history.

(56) References Cited

U.S. PATENT DOCUMENTS

| 4,733,945 | A * | 3/1988 | Bacich .......................... 359/820 |
| 4,910,620 | A * | 3/1990 | Olbrich ....................... 360/98.08 |
| 6,173,996 | B1 * | 1/2001 | Derakhshan et al. .......... 285/114 |
| 6,549,347 | B1 * | 4/2003 | Spinali ........................... 359/819 |
| 2009/0067917 | A1 * | 3/2009 | Keith et al. ..................... 403/30 |
| 2011/0075279 | A1 * | 3/2011 | Reichmann et al. ........... 359/820 |

* cited by examiner

*Primary Examiner* — Michael P Ferguson
(74) *Attorney, Agent, or Firm* — Global IP Services, PLLC; Prakash Nama; Daniel J. Long

(57) ABSTRACT

A rigid adaptor ring for coefficient of thermal expansion (CTE) mismatched optical device components is disclosed. In one embodiment, either side of the rigid adaptor ring includes one or more mounting pads that are configured to interface between the CTE mismatched optical device components.

5 Claims, 3 Drawing Sheets

RIGID ADAPTOR RING FOR CTE MISMATCHED OPTICAL DEVICE COMPONENTS

CROSS-REFERENCE TO RELATED APPLICATIONS

This Application claims rights under 35 USC §119(e) from U.S. Application 61/526,502 filed Aug. 23, 2011, the contents of which are incorporated herein by reference.

BACKGROUND OF THE INVENTION

1. Field of the Invention

The present application relates to optical device components and more particularly to connecting optical device components having mismatched coefficients of thermal expansion (CTEs).

2. Brief Description of Related Art

Although there is a desire for many optical and structural components used in military and aerospace applications to be made out of one common optical material, such as silicon carbide, it is often impractical to design an entire optical device assembly out of such materials. Silicon carbide and similar optical materials provide a favorably low coefficient of thermal expansion (CTE) but are brittle and typically may not satisfy the structural capabilities required by a support structure.

For this reason, typically, an interface system between the silicon carbide structure and the remainder of the assembly is used, which most often is made from a higher CTE metallic material, such as aluminum or steel. Because of the significant mismatch in CTE between optical materials, such as silicon carbide and metallic material, large stresses can develop when such assembly is subjected to a temperature change. Due to the brittle nature of optical materials, the thermally induced stresses can cause fracture in the optical materials and metals unless the interface system is provided to mitigate the induced stress.

Several existing techniques are used to attach materials with dissimilar CTEs that will be subjected to conditions spanning a range of temperatures:

One existing technique uses "soft" attachments, made out of a flexible material, between the two CTE mismatched components to accommodate differential expansion/contraction. However, the movement permitted by flexible mounts is often unacceptable because telescopes and their support structures commonly need to be held rigidly together to maintain accuracy and alignment. Therefore, this method may work for relatively small components where thermal expansion is minimal, but may not be effective for any larger optical device components.

Another existing technique uses flexures, which are designed to flex and eliminate stresses induced by thermal effects. However, depending on the materials, they may or may not be effective. For example, brittle materials cannot use flexures due to increased risks of material fracture.

Other existing techniques use complex metering structures to mitigate the thermal effects. However, these metering structures add several complicated components to the assembly, resulting in substantial and undesirable increases in weight, complexity, and cost of the products.

SUMMARY OF THE INVENTION

A rigid adaptor ring for coefficient of thermal expansion (CTE) mismatched optical device components is disclosed. According to one aspect of the present subject matter, the rigid adaptor ring includes one or more mounting pads on either side of the rigid adaptor ring that are configured to interface between the CTE mismatched optical device components.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein in detail for illustrative purposes are subject to many variations in structure and design.

Figure 1:
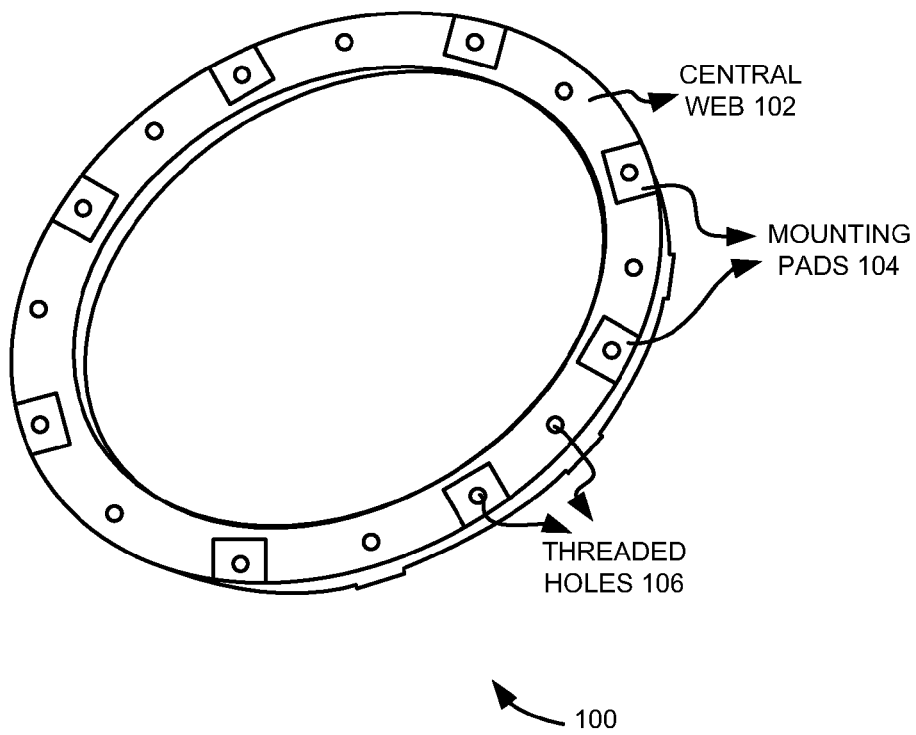
FIG. 1 illustrates an isometric view of a rigid adapter ring configured to connect CTE mismatched optical device components, according to an embodiment of the present subject matter.

FIG. 1 illustrates an isometric view of a rigid adapter ring 100 configured to connect coefficient of thermal expansion (CTE) mismatched optical device components, according to an embodiment of the present subject matter. Particularly, FIG. 1 illustrates the rigid adapter ring 100 including a central web 102, one or more mounting pads 104 and one or more threaded holes 106. As shown, the central web 102 includes the mounting pads 104 and centered on each mounting pad is the threaded hole containing a threaded insert for mounting the corresponding CTE mismatched optical device component. In one embodiment, the rigid adapter ring 100 is made of a metal having a CTE that is substantially close to a desired one of the CTE mismatched optical device components. For example, the rigid adapter ring 100 is made of Invar. Exemplary shape of the rigid adapter ring 100 includes round, square and rectangle.

In one embodiment, the rigid adapter ring 100 includes the mounting pads 104 on either side of the rigid adapter ring 100. The mounting pads 104 are configured to interface between the CTE mismatched optical device components. This is explained in more detail with reference to FIG. 3. Further, the mounting pads 104 are integral to the rigid adapter ring 100. Furthermore, mounting pads 104 on one side of the rigid adapter ring 100 is substantially circumferentially offset from the mounting pads 104 on the other side of the rigid adapter ring. This is explained in more detail with reference to FIG. 2. In addition, geometrical properties of the rigid adapter ring 100 are configured to provide a substantially reduced thermal stress between the CTE mismatched optical device components. The geometrical properties include thickness of the rigid adapter ring 100, width of the rigid adapter ring 100 and number of mounting pads 104 used on either side of the rigid adapter ring 100.

Figure 2:
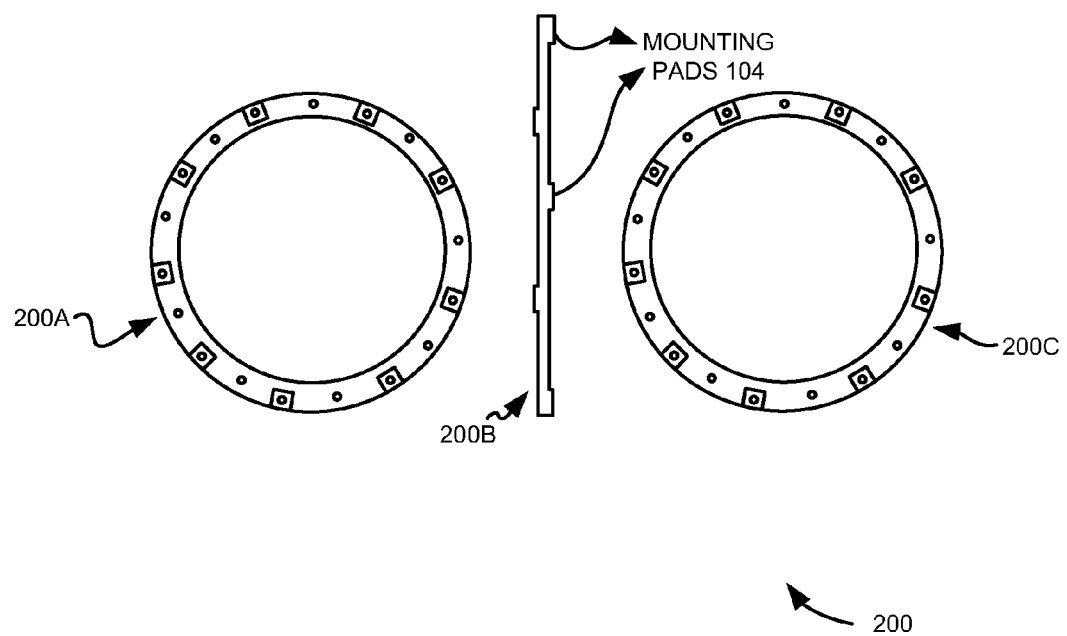
FIG. 2 illustrates a front view, a side view and a rear view of the rigid adapter ring, such as the one shown in FIG. 1, according to an embodiment of the present subject matter.

Referring now to FIG. 2, which illustrates a front view 200A, a side view 200B and a rear view 200C of the rigid adapter ring 100, such as the one shown in FIG. 1, according to an embodiment of the present subject matter. As shown, the front view 200A and the rear view 200B includes mounting pads 104, one for each CTE mismatched optical device component to be joined. This is explained in more detail with reference to FIG. 3. Further, the side view 200B illustrates the mounting pads 104 on one side of the rigid adapter ring 100 being substantially circumferentially offset from the mounting pads 104 on the other side of the rigid adapter ring by a maximum angle. This configuration enables to substantially reduce thermal stress between the CTE mismatched optical device components and direct the majority of thermally induced stresses into a less brittle component.

In one embodiment, geometrical properties of the rigid adapter ring 100 are configured to provide the substantially reduced thermal stress between the CTE mismatched optical device components. The geometrical properties include thickness of the rigid adapter ring 100, width of the rigid adapter ring 100 and number of mounting pads 104 used on either side of the rigid adapter ring 100.

Figure 3:
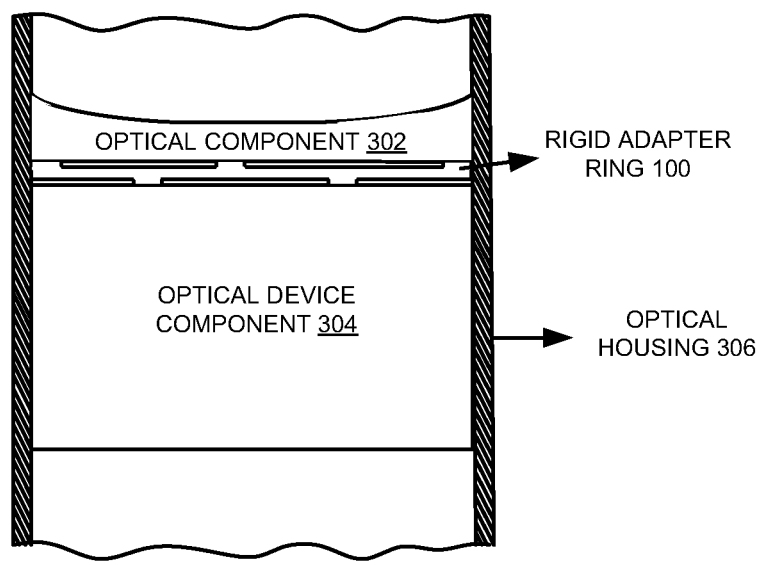
FIG. 3 illustrates a sectional view of an optical device assembly including the rigid adapter ring, such as those shown in FIGS. 1 and 2, between CTE mismatched components, according to an embodiment of the present subject matter.

Referring now to FIG. 3, which illustrates a sectional view of an optical device assembly 300 including the rigid adapter ring 100, such as those shown in FIGS. 1 and 2, between CTE mismatched components, according to an embodiment of the present subject matter. Exemplary optical device assembly 300 includes a telescope assembly, a camera assembly, and a laser rangefinder assembly. Particularly, the sectional view of the optical device assembly 300 illustrates an optical component 302, an optical device component 304, the rigid ring adapter 100 and an optical housing 306. For example, the optical device component 304 is made of a metallic material and the optical component 302 is made of silicon carbide. Exemplary optical component 302 includes optical lens.

As shown in FIG. 3, the optical component 302 is configured to be disposed in the optical housing 306. Further, the optical device component 304, having a CTE different from a CTE of the optical component 302 is configured to be disposed in the optical housing 306. Furthermore, the rigid adapter ring 100 is disposed between the optical component 302 and the optical device component 304 and within the optical housing 306. For example, the rigid adapter ring is made of Invar.

In one embodiment, the rigid adapter ring 100 has the mounting pads 104, shown in FIG. 1, on either side of the rigid adapter ring 100 that are configured to interface between the CTE mismatched optical component 302 and the optical device component 304. The CTE of the rigid adapter ring 100 is substantially closer to the CTE of the optical component 302 thereby substantially eliminates stresses on the optical component 302 and prevents fracture. Further, the mounting pads 104 are attached to either side of the rigid adapter ring 100. Centered on each mounting pad is the threaded hole containing a threaded insert for mounting the corresponding CTE mismatched optical device component. Furthermore, the mounting pads 104 on one side of the rigid adapter ring 100 is substantially circumferentially offset from the one or more mounting pads on the other side of the rigid adapter ring.

Further in this embodiment, offsetting the mounting pads 104 eliminates direct bolted connection between the optical component 302 and the optical device component 304. This offset, along with the strength of the rigid adaptor ring 100, forces the majority of the thermal stresses to develop in the rigid adapter ring 100. The majority of the residual stresses in the rigid adaptor ring 100 will then be developed in the central web 102 of the rigid adapter ring 100, shown in FIG. 1, effectively isolating the optical component 302.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An optical device assembly within a telescope, a camera or a laser rangefinder, the optical device assembly comprising:

an optical housing having a cylindrical cavity therein defining an annular inner wall;

an optical lens having an annular outer peripheral wall and an axially facing end abutment surface, the optical lens made of silicon carbide and configured to be disposed in the optical housing such that the peripheral wall of the optical lens engages the inner wall of the housing;

an optical device support structure having an annular outer peripheral wall and an axially facing end abutment surface, the support structure made of a metallic material and having a coefficient of thermal expansion (CTE) different from a CTE of the optical lens made of silicon carbide and configured to be disposed in the optical housing such that the peripheral wall of the support structure engages the inner wall of the housing; and a rigid adapter ring having an annular outer peripheral wall, the adapter ring configured to be disposed in the optical housing such that the peripheral wall of the adapter ring engages the inner wall of the housing, wherein the rigid adapter ring is made of Invar, wherein the rigid adapter ring is disposed between the optical lens made of silicon carbide and the optical device support structure made of the metallic material and within the optical housing, and wherein the rigid adapter ring has a plurality of circumferentially spaced mounting pads on each axial side of the rigid adapter ring that are configured to interface between the CTE mismatched optical lens made of silicon carbide and the optical device support structure made of the metallic material such that the mounting pads engage the respective end abutment surfaces of the optical lens and the optical device support structure, a central web section of the adapter ring extending between each pair of adjacent mounting pads, and a threaded hole extending through each mounting pad and central web section, and wherein the CTE of the rigid adapter ring made of Invar is substantially closer to the CTE of the optical lens made of silicon carbide.

2. The optical device assembly of claim 1, wherein the mounting pads are integral to the rigid adapter ring.

3. The optical device assembly of claim 1, wherein geometrical properties of the rigid adapter ring are configured to provide a substantially reduced thermal stress between the CTE mismatched optical lens made of silicon carbide and the optical device support structure, wherein the geometrical properties are selected from the group consisting of thickness of the rigid adapter ring, width of the rigid adapter ring and number of mounting pads used on each side of the rigid adapter ring.

4. The optical device assembly of claim 1, wherein the mounting pads on one side of the rigid adapter ring are substantially circumferentially offset from the mounting pads on the other side of the rigid adapter ring.

5. The optical device assembly of claim 1, wherein a shape of the rigid adapter ring is selected from the group consisting of round, square and rectangle.

* * * * *